(12) United States Patent
Fujiwara

(45) Date of Patent: Sep. 29, 2020
(10) Patent No.: US 10,786,862 B2

(54) PULSE ARC WELDING CONTROL METHOD AND PULSE ARC WELDING DEVICE

(71) Applicant: Panasonic Intellectual Property Management Co., Ltd., Osaka (JP)

(72) Inventor: Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 15/776,310

(22) PCT Filed: Dec. 27, 2016

(86) PCT No.: PCT/JP2016/005226
§ 371 (c)(1),
(2) Date: May 15, 2018

(87) PCT Pub. No.: WO2017/125989
PCT Pub. Date: Jul. 27, 2017

(65) Prior Publication Data
US 2018/0326526 A1 Nov. 15, 2018

(30) Foreign Application Priority Data
Jan. 21, 2016 (JP) .................................. 2016-009420

(51) Int. Cl.
*B23K 9/173* (2006.01)
*B23K 9/095* (2006.01)
*B23K 9/09* (2006.01)

(52) U.S. Cl.
CPC ............. *B23K 9/173* (2013.01); *B23K 9/09* (2013.01); *B23K 9/095* (2013.01)

(58) Field of Classification Search
CPC ........ B23K 9/073; B23K 9/173; B23K 9/095; B23K 9/09
(Continued)

(56) References Cited

U.S. PATENT DOCUMENTS

| 4,438,317 A | * | 3/1984 | Ueguri | B23K 9/091 |
| | | | | 219/130.31 |
| 5,473,139 A | * | 12/1995 | Matsui | B23K 9/092 |
| | | | | 219/130.51 |

(Continued)

FOREIGN PATENT DOCUMENTS

| JP | 60-180669 | 9/1985 |
| JP | 2973714 | 11/1999 |

(Continued)

OTHER PUBLICATIONS

International Search Report of PCT application No. PCT/JP2016/005226 dated Feb. 21, 2017.

*Primary Examiner* — Thien S Tran
(74) *Attorney, Agent, or Firm* — Wenderoth, Lind & Ponack, L.L.P.

(57) ABSTRACT

A pulse arc welding device is controlled so as to weld an object by removing, from a welding wire, a molten droplet produced by melting the welding wire by applying a welding voltage between the welding wire and the object and allowing a welding current to flow through the welding wire such that the welding current alternately repeats, at pulse frequency, a peak current period in which the welding current is a peak current and a base current period in which the welding current is a base current smaller than the peak current. A removal time point at which the molten droplet is removed from the welding wire is determined. In a case where the removal time point is not in the base current period, a pulse waveform parameter which is at least one of the peak current and the peak current period is adjusted, and the pulse frequency based on a predetermined relationship between the pulse frequency and the pulse waveform param- (Continued)

eter is adjusted so as to cause the removal time point to be in the base current period. This method allows a stable pulse arc welding.

11 Claims, 12 Drawing Sheets

(58) Field of Classification Search
USPC .................... 219/74, 130.32, 130.51, 137 PS
See application file for complete search history.

(56) References Cited

U.S. PATENT DOCUMENTS

| | | | |
|---|---|---|---|
| 5,495,091 A * | 2/1996 | Tabata | ................... B23K 9/092 |
| | | | 219/130.51 |
| 2009/0242533 A1* | 10/2009 | Yamazaki | ............ B23K 9/0732 |
| | | | 219/130.32 |
| 2014/0131320 A1 | 5/2014 | Hearn et al. | |

FOREIGN PATENT DOCUMENTS

| | | |
|---|---|---|
| JP | 2014-226677 | 12/2014 |
| JP | 2015-157304 | 9/2015 |
| JP | 2015-533657 | 11/2015 |

* cited by examiner

PULSE ARC WELDING CONTROL METHOD AND PULSE ARC WELDING DEVICE

CROSS-REFERENCE TO RELATED APPLICATIONS

This application is a U.S. national stage application of the PCT international application No. PCT/JP2016/005226 filed on Dec. 27, 2016, which claims the benefit of foreign priority of Japanese patent application No. 2016-009420 filed on Jan. 21, 2016, the contents all of which are incorporated herein by reference.

TECHNICAL FIELD

The present invention relates to a pulse arc welding control method and a pulse arc welding device for performing a pulse arc welding while feeding a welding wire which is a consumable electrode.

BACKGROUND ART

In a conventional pulse arc welding machine, it is common to build a database of welding conditions suitable for each material, such as mild steel and stainless steel, with the welding wire recommended by each welding machine manufacturer individually. For example, in a case of a pulse waveform, parameters, such as peak current, base current, pulse frequency, are adjusted while each operator of the welding machine manufacturers checks construction and builds databases individually.

However, users using welding machines do not necessarily use the welding wire recommended by the welding machine manufacturer. With respect to the welding wires recommended by the welding machine manufacturer, a molten droplet transfer status is different from each other when material properties, such as viscosity and surface tension, of the welding wires actually used by the user are different from each other. When the molten droplet transfer status is greatly different, the droplet transfer status is not a droplet removal transfer due to the base current period, such as one drop per one pulse (one time of droplet removal per one pulse occurs) which is the fundamental droplet transfer status of pulse arc welding, the droplet transfer status becomes unstable, e.g. one pulse n drop (multiple droplet removal occurs per one pulse) or one drop per number n of pulses (one time occurrence of droplet removal per multiple pulses).

Accordingly, since there is no regularity at the time point when the molten droplet of the droplet transfer is removed, an optimal database is required for each welding wire in order to perform stable welding.

Therefore, a pulse arc welding method is known in which the peak current period continues until the molten droplet of the droplet transfer is removed, and the droplet removal is surely caused one time per one period of the pulse (See, for example, PTL 1).

CITATION LIST

Patent Literature

PTL 1: Japanese Patent Laid-Open Publication No. 60-180669

SUMMARY

A pulse arc welding control method uses a pulse arc welding device that welds an object by generating an arc between a welding wire and the object. The pulse arc welding device is controlled so as to weld the object by removing, from the welding wire, a molten droplet produced by melting the welding wire by applying a welding voltage between the welding wire and the object and allowing a welding current to flow through the welding wire such that the welding current alternately repeats, at pulse frequency, a peak current period in which the welding current is a peak current and a base current period in which the welding current is a base current smaller than the peak current. A removal time point at which the molten droplet is removed from the welding wire is determined. In a case where the removal time point is not in the base current period, a pulse waveform parameter which is at least one of the peak current and the peak current period is adjusted, and the pulse frequency based on a predetermined relationship between the pulse frequency and the pulse waveform parameter is adjusted so as to cause the removal time point to be in the base current period.

This pulse arc welding control method allows the pulse arc welding device to stably perform pulse welding, and provides a bead having a preferable shape.

DETAILED DESCRIPTION OF PREFERRED EMBODIMENTS

Exemplary Embodiment 1

Figure 1:
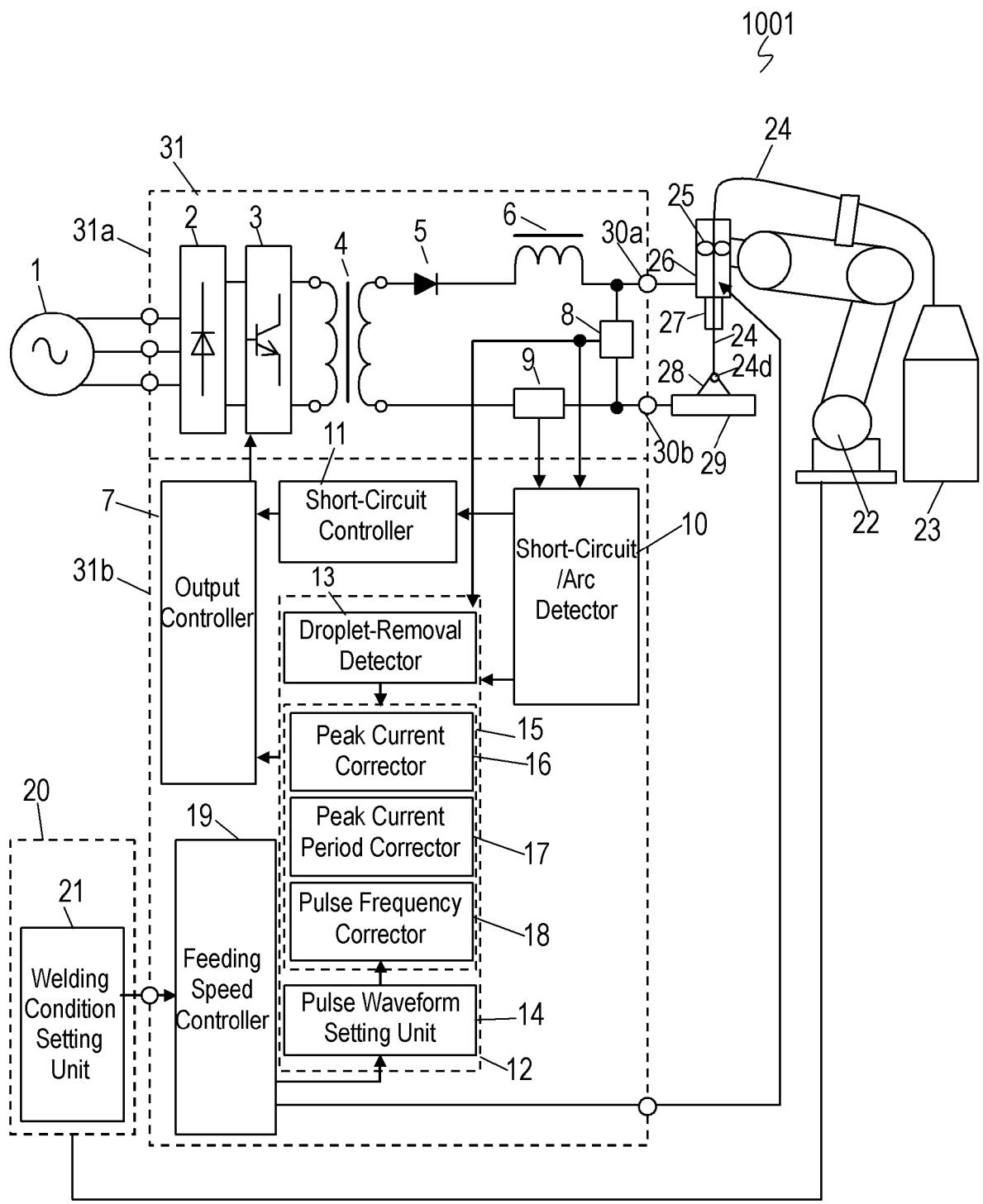
FIG. 1 is a schematic diagram of an arc welding device according to Exemplary Embodiment 1.

FIG. 1 is a schematic diagram of pulse arc welding device 1001 according to Exemplary embodiment 1. Pulse arc welding device 1001 includes welding power supply device 31 and robot 22 (manipulator).

Welding power supply device 31 includes primary rectifier 2 for rectifying an output of input power supply 1, switching element 3 that controls a welding output by controlling an output of primary rectifier 2, transformer 4 for insulating and converting the output from switching element 3 and outputting from secondary side output, secondary rectifier 5 for rectifying an output from the secondary side output of transformer 4, and reactor 6 (DCL) connected in series to secondary rectifier 5. Welding power supply device 31 further includes output controller 7 for driving switching element 3, welding voltage detector 8, and welding current detector 9. Welding power supply device 31 further includes short-circuit/arc detector 10, short-circuit controller 11, and arc controller 12. Welding voltage detector 8 detects welding voltage V between object 29 and welding wire 24. Welding current detector 9 detects welding current I flowing through welding wire 24. Short-circuit controller 11 and arc controller 12 control output controller 7. Welding power supply device 31 further includes feeding speed controller 19 that controls the feeding speed at which welding wire 24 is fed in accordance with welding conditions, output terminal 30a, and output terminal 30b.

Arc controller 12 includes pulse waveform setting unit 14, pulse waveform controller 15, and droplet-removal detector 13. Pulse waveform controller 15 includes peak current corrector 16, peak current period corrector 17, and pulse frequency corrector 18.

Robot controller 20 that controls an operation of robot 22 includes welding condition setting unit 21 for setting welding conditions. Robot controller 20 is connected to welding power supply device 31 so as to be capable of communicating with each other. Torch 26 is attached to robot 22. Torch 26 holds chip 27 holding welding wire 24.

Feeding speed controller 19 of welding power supply device 31 determines a feeding speed corresponding to the setting current of welding current I set in welding condition setting unit 21 provided in robot controller 20, and outputs a signal indicating the feeding speed. In response to the signal from feeding speed controller 19, pulse waveform setting unit 14 of arc controller 12 outputs a pulse waveform parameter, such as peak current IP and base current IB, according to the wire feeding speed indicated by the received signal. Pulse waveform controller 15 controls a pulse waveform of the welding current based on the value of each pulse waveform parameter. In addition, based on a signal from feeding speed controller 19, wire feeder 25 with a feed roller feeds welding wire 24.

Welding condition setting unit 21 of robot controller 20 connected to welding power supply device 31 sets, e.g. a welding current and a welding voltage. Output terminal 30a of welding power supply device 31 is electrically connected to chip 27 holding welding wire 24, and supplies power to welding wire 24 via chip 27. Output terminal 30b is electrically connected to object 29 and supplies power to object 29. Arc 28 is generated between a tip end of welding wire 24 and object 29. Wire feeder 25 feeds welding wire 24 from welding wire storage 23 storing welding wire 24 to chip 27 of torch 26.

Constituent portions of pulse arc welding device 1001 illustrated in FIG. 1 may be configured separately or may be configured by combining plural constituent portions.

FIGS. 2 to 7 illustrates welding current I, welding voltage V, and a state of droplet transfer around welding wire 24 and object 29. Pulse arc welding device 1001 alternately repeats peak current period IPT in which welding current I is peak current IP and base current period IBT in which welding current I is base current IB smaller than peak current IP, and generates an arc between welding wire 24 and object 29 to perform a pulse welding. Pulse arc welding device 1001 adjusts a pulse waveform parameter that determines a waveform of welding current I while monitoring removal time point td at which molten droplet 24d is removed.

Figure 2:
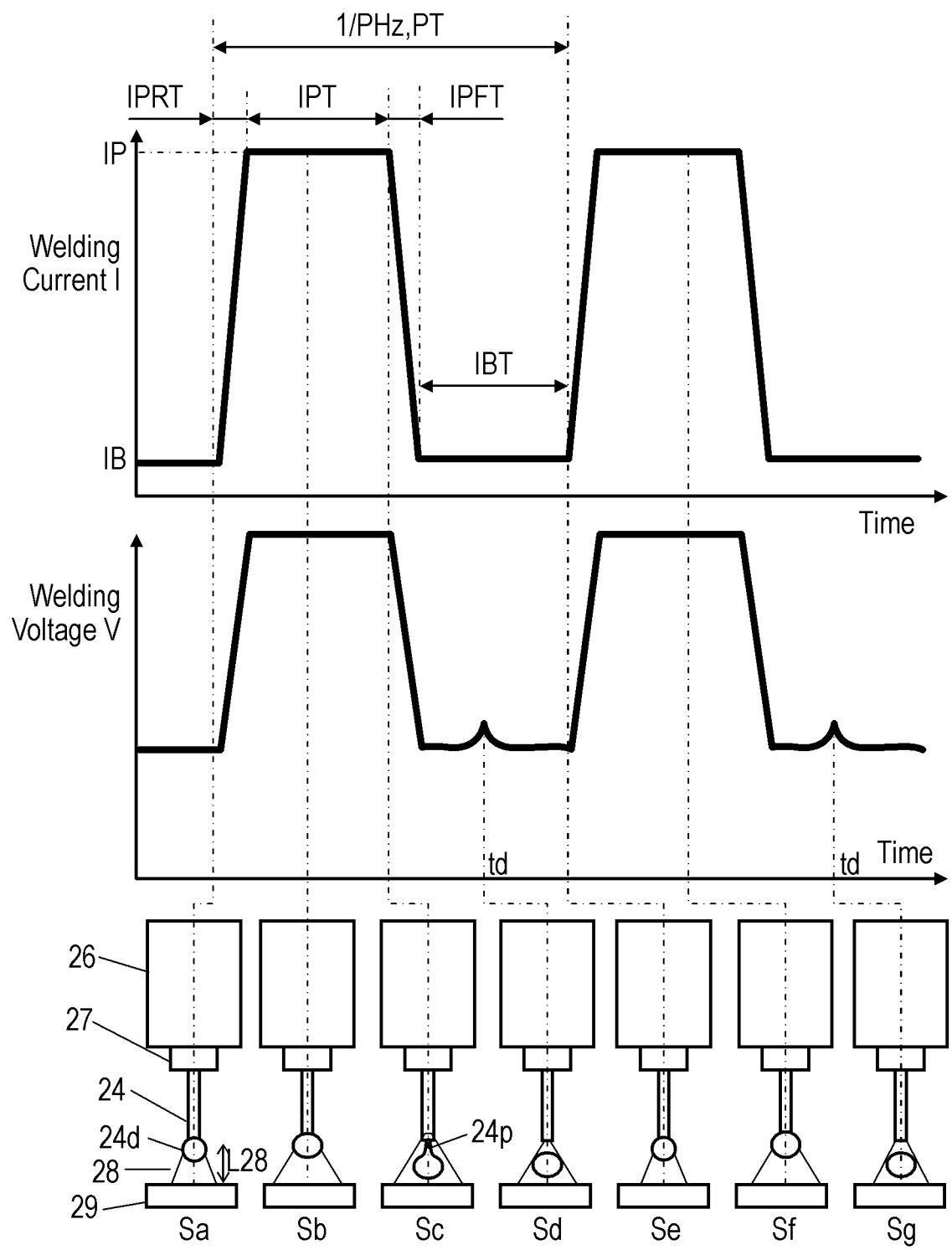
FIG. 2 illustrates a welding current, a welding voltage, and a state of droplet transfer of the pulse arc welding device according to Embodiment 1.

Welding current I has a pulse waveform which alternately repeats peak current IP and base current IB smaller than the peak current periodically with pulse period PT. The pulse waveform illustrated in FIG. 2 is a basic pulse waveform providing a stable droplet transfer (removal) repeating in a period in which welding is steadily performed. Pulse period PT includes pulse rising period IPRT, peak current period IPT, pulse falling period IPFT, and base current period IBT. In pulse rising period IPRT, welding current I transits from base current IB to peak current IP. In peak current period IPT, welding current I is peak current IP. In pulse falling period IPFT, welding current I transits from peak current IP to base current IB. In base current period IBT, welding current I is base current IB. Arc length L28 of arc 28 is stabilized by pulse frequency PHz which is a reciprocal of pulse period PT, and the droplet transfer is performed.

The pulse waveform parameters adjusted so as to realize so-called one drop per one pulse, in which droplet 24d is dropped onto object 29 only one time in one pulse period PT are different from each other according to welding conditions, such as object 29 and welding wire 24 to be used. Therefore, in order to realize the one drop per one pulse, welding conditions, such as recommended welding wire and shielding gas, can be previously determined by confirming construction of experiments.

Molten droplet 24d produced by melting welding wire 24 in pulse rising period IPRT starts growing (state Sa). Then, molten droplet 24d grows to have an optimal size during peak current period IPT (state Sb). Next, during pulse falling period IPFT, constriction 24p having a locally small diameter is produced (state Sc). Constriction 24p exhibits a state of immediately before molten droplet 24d is removed from the tip end of welding wire 24. After that, molten droplet 24d is removed from welding wire 24 at removal time point td during base current period IBT (state Sd). After that, molten droplet 24d produced by melting welding wire 24 in pulse rising period IPRT starts growing, and molten droplet 24d is grown until molten droplet 24d has a size enough to be removed from welding wire 24 in peak current period IPT (state Sf). Next, during pulse falling period IPFT, constriction 24p having a locally small diameter is produced at the tip of welding wire 24, is produced. Constriction 24p exhibits a state of immediately before molten droplet 24d is removed. After that, molten droplet 24d is removed from welding wire 24 at removal time point td during base current period IBT (state Sg). The pulse waveform of welding current I illustrated in FIG. 2 is an optimal waveform performing a basic molten droplet transfer in which one molten droplet 24d is removed from welding wire 24 only once in pulse period PT from pulse rising period IPRT to next pulse rising period IPRT.

The transfer (removal) of molten droplet 24d is repeated at pulse frequency PHz which is the reciprocal of pulse period PT provides a stable welding state and a bead having a preferable outer appearance with less spatter.

Figure 3:
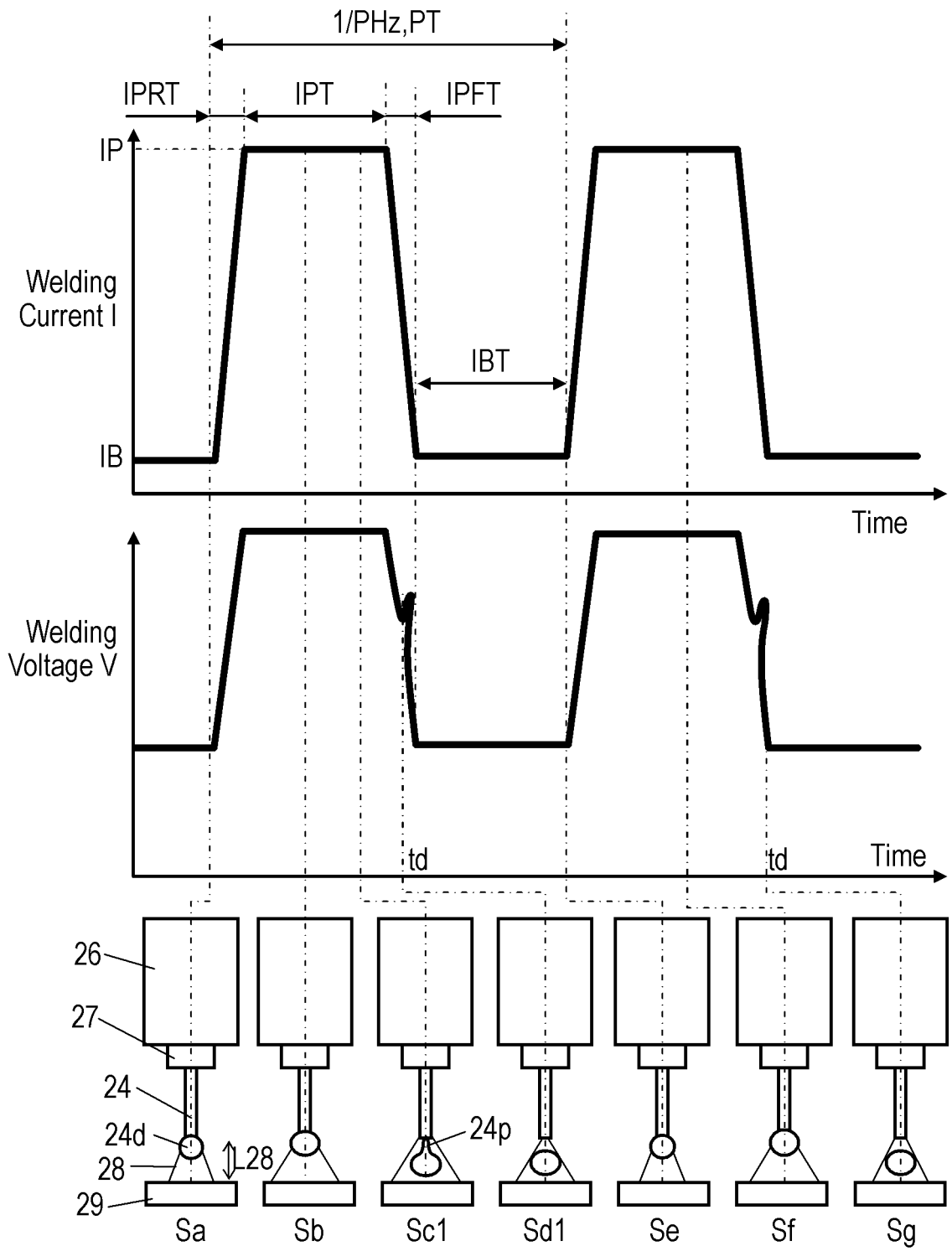
FIG. 3 illustrates a welding current, a welding voltage, and a state of droplet transfer of a comparative example of a pulse arc welding device.
Figure 4:
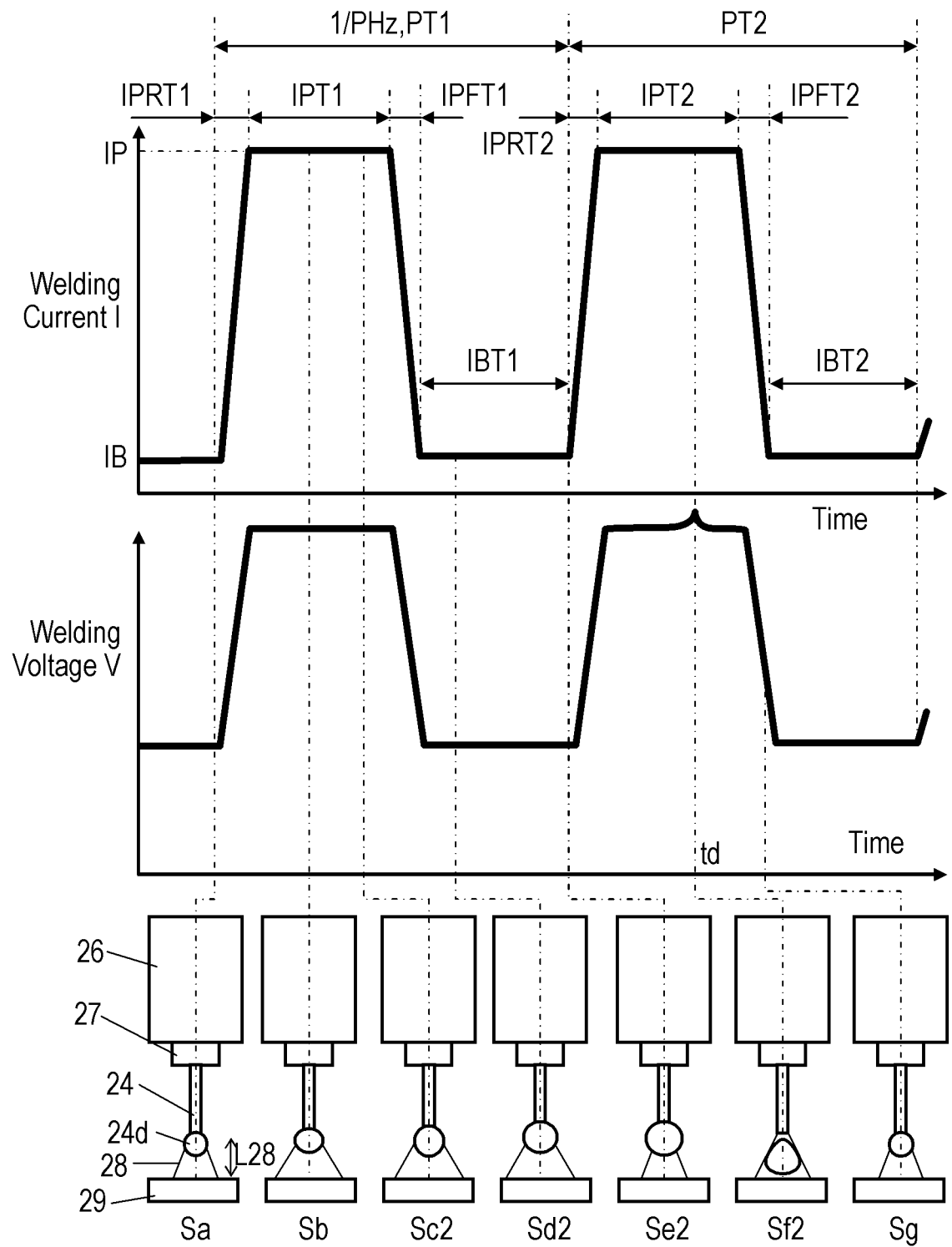
FIG. 4 illustrates a welding current, a welding voltage, and a state of droplet transfer of the comparative example of the pulse arc welding device.

FIGS. 3 and 4 illustrate welding current I, welding voltage V, and the state of welding transfer in the state of the comparative example in which molten droplet 24d is not stably removed.

In the pulse waveform of welding current I illustrated in FIG. 3, as compared with the pulse waveform illustrated in FIG. 2 realizing a basic droplet removal state where molten droplet 24d is removed in base current period IBT, welding wire 24 is excessively melted so that molten droplet 24d is unstably removed from welding wire 24. In the pulse waveform illustrated in FIG. 3, molten droplet 24d starts growing in pulse rising period IPRT (state Sa), and molten droplet 24d is grown until molten droplet 24d has the optimal size in peak current period IPT (state Sb, Sc1). After that, molten droplet 24d is removed from welding wire 24 at the tip of the welding wire at removal time point td during pulse falling period IPFT (state Sd1). The waveform of welding current I illustrated in FIG. 3 is a pulse waveform of a non-optimal, unstable molten droplet transfer (droplet removal) which is a state where molten droplet 24d cannot be removed from welding wire 24 (state Sd) during base current period IBT after pulse falling period IPFT. In other words, in welding current I illustrated in FIG. 3, removal time point td at which molten droplet 24d is removed in pulse falling period IPFT transferring from peak current period IPT to base current period IBT is before base current period IBT, that is, is earlier than base current period IBT.

As this molten droplet transfer (droplet removal) state is repeated at pulse frequency PHz, removal time point td at which molten droplet 24d is removed may fluctuate, resulting in an unstable welding state.

The unstable molten droplet transfer (droplet removal) state illustrated in FIG. 3 is often produced in a state where the viscosity or surface tension of the molten welding wire is lower than recommended welding wire 24. In this case, the actually used welding wire 24 is melted or a case the ratio of the Ar gas of the shielding gas increases, with respect to recommended welding wire 24.

In the pulse waveform of welding current I illustrated in FIG. 4, the molten droplet transfer is unstable as compared with the pulse waveform illustrated in FIG. 2 which realizes the fundamental droplet removal state where molten droplet 24d is removed in base current period IBT. In this case, molten droplet 24d is not removed even when transferring from peak current period IPT1 in pulse period PT1 to base current period IBT1. In pulse rising period IPRT1 in pulse period PT1, molten droplet 24d starts to grow (state Sa), and molten droplet 24d is grown until molten droplet 24d has the optimal size in peak current period IPT1 (state Sb). Subsequently, in pulse falling period IPFT1 in pulse period PT1, constriction 24p which is a state immediately before molten droplet 24d is removed from the tip of welding wire 24 is not produced (state Sc2), and molten droplet 24d cannot be removed from welding wire 24 even in base current period IBT1 (state Sd2). Molten droplet 24d is enlarged (state Se2) in peak current period IPT2 at removal time point td in pulse period PT2 next to pulse period PT1 and removed by gravity (state Sf2). The state of molten droplet transfer illustrated in FIG. 4 is the most unstable. In welding current I illustrated in FIG. 4, molten droplet 24d is not removed even in a case of transferring from peak current period IPT1 of a certain pulse period PT1 to base current period IBT1, and molten droplet 24d is finally removed at removal time point td during peak current period IPT2 of pulse period PT2 next to the pulse period PT1, that is, the time point at which molten droplet 24d is removed is late, and a state of one drop per n pulses is exhibited.

By repeating this molten droplet transfer (droplet removal) state at pulse frequency PHz, removal time point td at which molten droplet 24d is removed largely fluctuates, resulting in an unstable welding state.

Such a molten droplet transfer (droplet removal) state often becomes an unstable state when welding wire 24 actually used has higher viscosity and surface tension of than the recommended material characteristics and welding conditions of welding wire 24 or when the Ar gas ratio of the shielding gas is low.

In order to eliminate the unstable molten droplet transfer (droplet removal) state due to the differences of welding wire 24 and the shielding gas as described above, in pulse arc welding device 1001 according to Embodiment 1, removal time point td of molten droplet transfer (droplet removal) after the next period is adjusted by one or pulse waveform parameters so as to optimize removal time point td at which molten droplet 24d is removed. Specifically, the state of molten droplet transfer is monitored so as to be a state of one drop per one pulse which is an optimal state where molten droplet 24d is removed (state Sd) in base current period IBT during pulse period PT. According to removal time point td at which molten droplet 24d in the molten droplet transfer state is removed, the one or more parameters of adjust removal time point td of molten droplet transfer (removal of molten droplet 24d) after the next period.

An example of adjustment of pulse waveform parameters in pulse arc welding device 1001 according tp Embodiment 1 will be described below.

Figure 5:
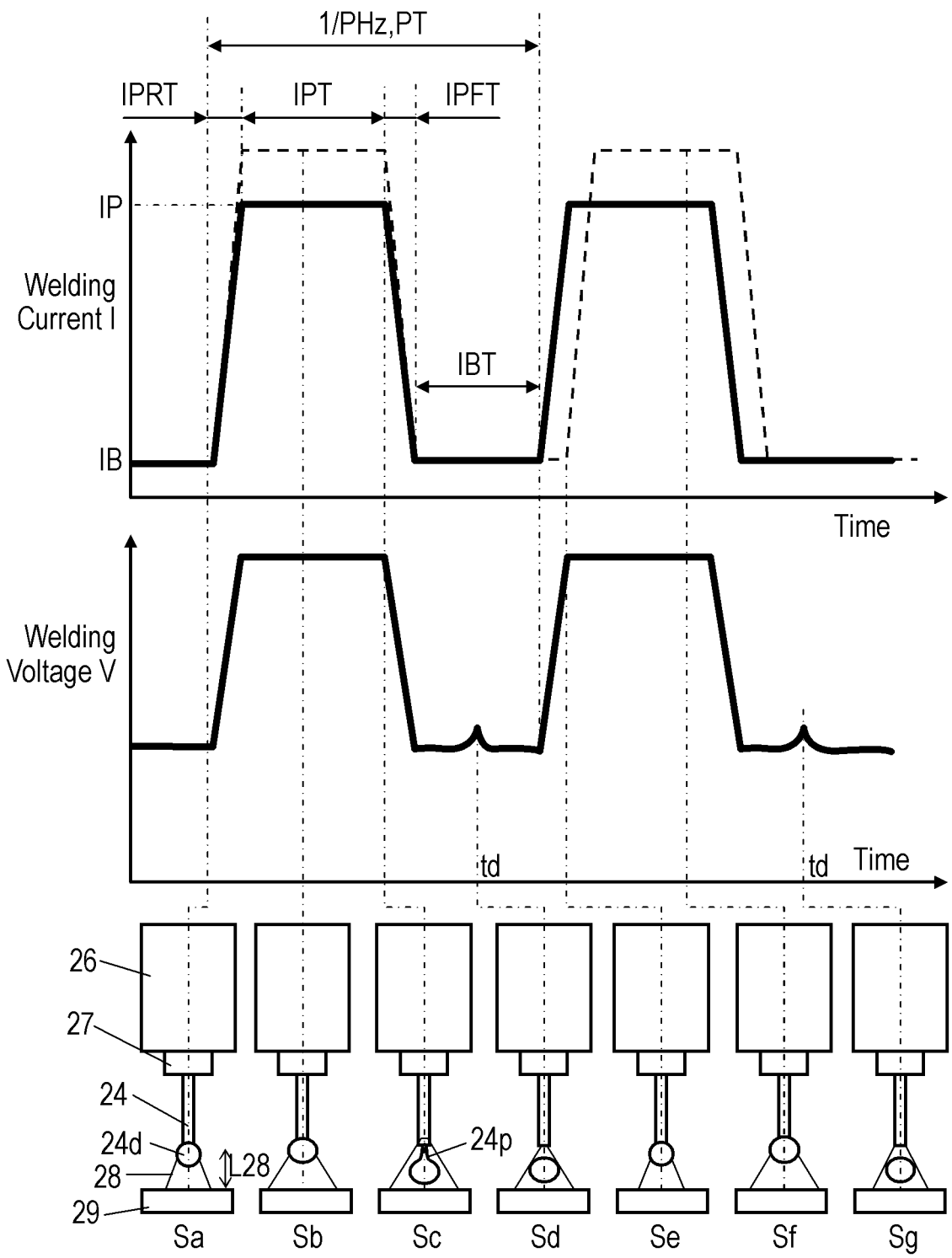
FIG. 5 illustrates a welding current, a welding voltage, and a state of droplet transfer of the pulse arc welding device according to Embodiment 1.

FIG. 5 illustrates welding current I, welding voltage V, and the state of molten droplet transfer of pulse arc welding device 1001. In FIG. 5, removal time point td at which molten droplet 24d is removed in the molten droplet transfer is adjusted by adjusting peak current IP. Specifically, in welding current I illustrated in FIG. 5, with respect to the molten droplet transfer state illustrated in FIG. 3 where molten droplet 24d is removed from the tip of welding wire 24 in pulse falling period IPFT before base current period IBT (state Sc), the electric energy applied to welding wire 24 is made appropriate by decreasing peak current IP from peak current IP illustrated in FIG. 3 to decrease the area of one peak of the pulse waveform of welding current I in one pulse period PT.

In welding current I illustrated in FIG. 5, since the area of the one peak of the pulse waveform is decreased, in order to secure an appropriate melting speed of welding wire 24, the pulse waveform parameters (peak current IP and pulse frequency PHz) are adjusted so that welding current I becomes a setting current that is an appropriate average value by decreasing peak current IP and shortening pulse period PT, i.e., increasing pulse frequency PHz. This operation provides a droplet removal timing in an optimal state where molten droplet 24d is removed in base current period IBT while stabilizing arc length L28.

In the method described above for adjusting removal time point td at which molten droplet 24d is removed in the molten droplet transfer by adjusting peak current IP, conversely, in the molten droplet transfer (removal) state illustrated in FIG. 4, the value of peak current IP is made larger than peak current IP illustrated in FIG. 4 to increase the area per one pulse period PT of the pulse waveform, and the electric energy applied to welding wire 24 is made appropriate with respect to the most unstable molten droplet transfer (removal) state (State Sf2) in which the molten droplet 24d is enlarged and is removed by gravity in peak current period IPT2 of pulse period PT2 next to pulse period PT1, not during base current period IBT1 of pulse period PT1.

In welding current I described above, since the pulse area is made large, in order to secure an appropriate melting speed of welding wire 24, peak current IP is made large and pulse period PT is lengthened to lower pulse frequency PHz, thereby adjusting the pulse waveform parameter (peak current IP). This operation provides a droplet removal timing in an optimal state where molten droplet 24d is removed in a base current period IBT while stabilizing arc length L28.

Figure 6:
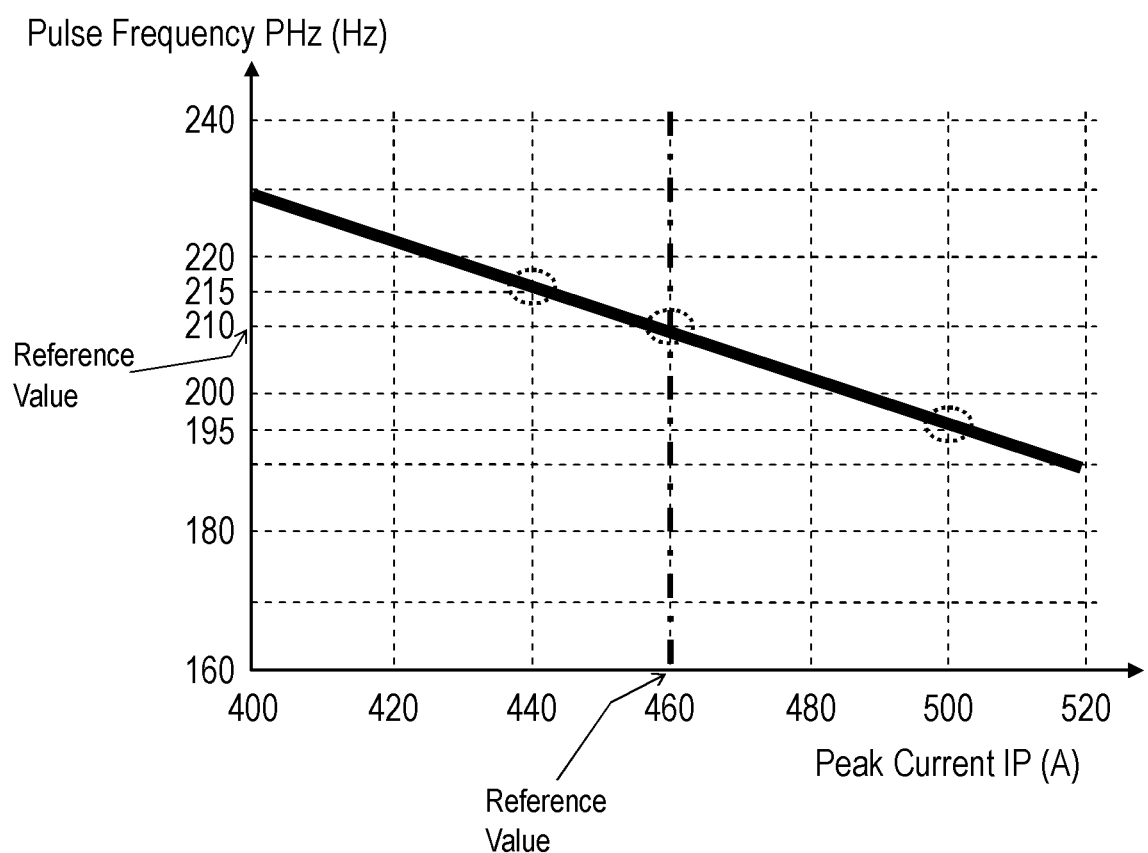
FIG. 6 illustrates a relationship between the pulse frequency and the peak current of the pulse arc welding device according to Embodiment 1.

An example of specific adjustment of peak current IP and pulse frequency PHz in pulse arc welding device 1001 will be described below. FIG. 6 illustrates a predetermined relationship between peak current IP and pulse frequency PHz, which is a pulse waveform parameter for optimally adjusting the molten droplet transfer (droplet removal) state while stabilizing arc length L28.

FIG. 6 illustrates the predetermined relationship between peak current IP and pulse frequency PHz in a case where the diameter of welding wire 24 is ϕ1.2 and the setting current of welding current I is 200 A in pulse MAG welding in which welding wire 24 is a mild steel, the reference value of peak current IP is 460 A, and the reference value of pulse frequency PHz is 210 Hz.

Adjustment of pulse waveform parameters based on the relationship illustrated in FIG. 6 of pulse arc welding device 1001 will be described below in the case that welding wire 24 or shielding gas having different conditions from the recommended conditions is used.

As illustrated in FIG. 3, in a case where molten droplet 24d is removed before base current period IBT and the droplet removal timing is too early, it is determined that the melting speed of welding wire 24 is too high. On the other hand, in order to set the optimum pulse waveform area as the melting speed of welding wire 24 based on the predetermined relationship between pulse frequency PHz and peak current IP illustrated in FIG. 6, in a case where peak current IP is made smaller than reference value 460 A described above as 440 A, stable arc length L28 can be secured by increasing pulse frequency PHz from reference value 210 Hz to 215 Hz.

In contrast, as illustrated in FIG. 4, in a case where molten droplet 24d is not removed during base current period IBT 1 in pulse period PT1 and molten droplet 24d is removed after base current period IBT1, that is, removal time point td when molten droplet 24d is removed is late in peak current period IPT 2 of pulse period PT 2 next to pulse period PT1, it is determined that the melting speed of welding wire 24 is too low. In order to set the area of the optimum pulse waveform which is the appropriate melting speed of the welding wire, based on the relationship between pulse frequency PHz and peak current IP illustrated in FIG. 6, in a case where peak current IP increases from reference value 460 A to 500 A, stable arc length L28 can be secured by pulse frequency PHz decreasing from reference value 210 Hz to 195 Hz.

As described above, based on the predetermined relationship between pulse frequency PHz and peak current IP, if removal time point td at which molten droplet 24d is removed is not in base current period IBT1, peak current IP as the pulse waveform parameter is adjusted and pulse frequency PHz is adjusted such that removal time point td is in base current period IBT1. Specifically, in a case where removal time point td is earlier than base current period IBT1, that is, before base current period IBT1, welding controller 31b decreases peak current IP and increases pulse frequency PHz. In a case where removal time point td is later than base current period IBT1, that is, after base current period IBT1, peak current IP and pulse frequency PHz, which are pulse waveform parameters, are adjusted so as to increase peak current IP and decrease pulse frequency PHz.

Figure 7:
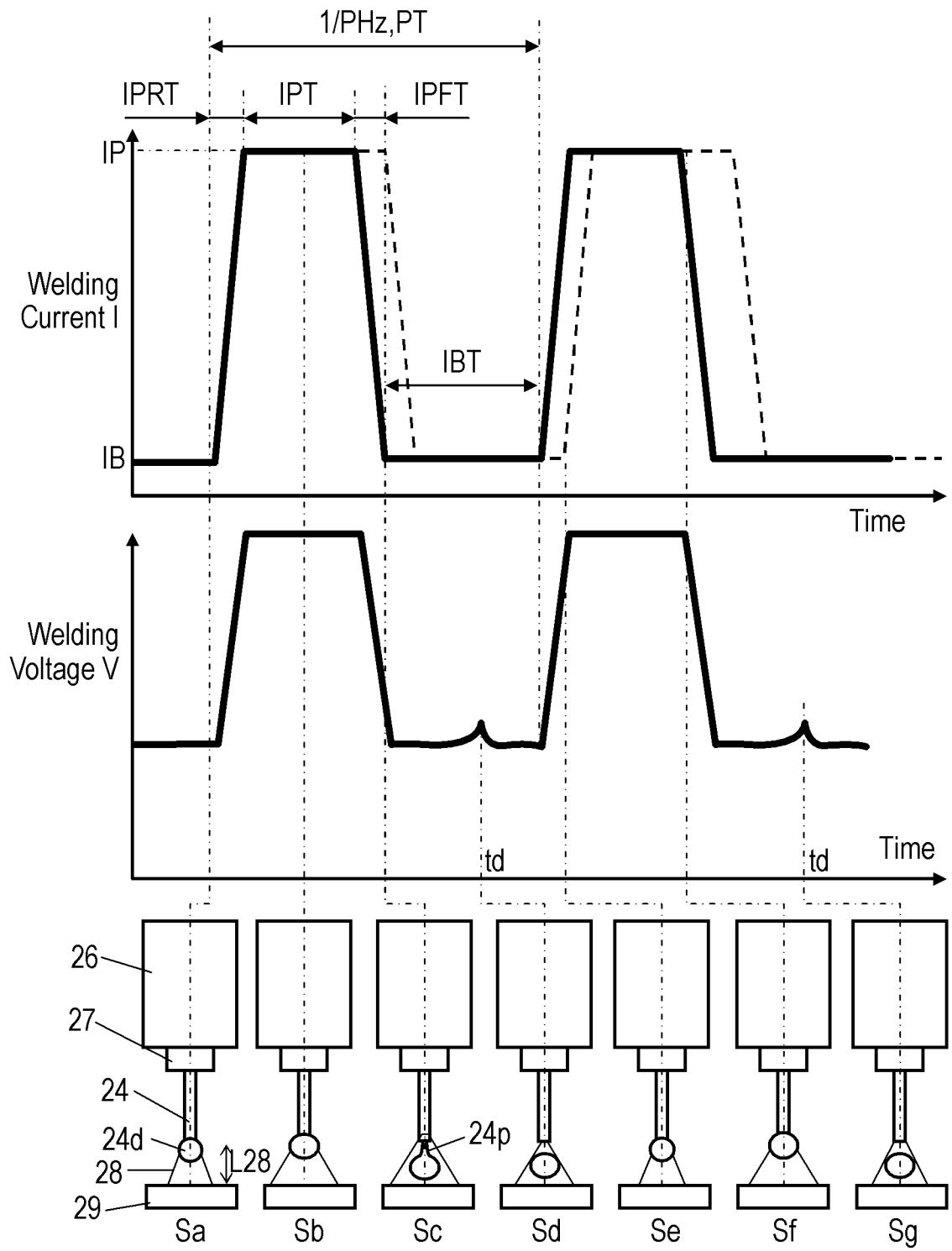
FIG. 7 illustrates a welding current, a welding voltage, and a state of droplet transfer of the pulse arc welding device in accordance with Embodiment 1.

In pulse arc welding device 1001 according to Embodiment 1, by adjusting not peak current IP but the length of peak current period IPT, the timing at which molten droplet 24d is removed can be adjusted. FIG. 7 illustrates states of welding voltage V, welding current I, welding current I a state of the welding transfer in a case where a timing at which molten droplet 24d of the molten droplet transfer (droplet removal) state is removed by adjusting peak current period IPT is adjusted. With respect to state Sd1 in which molten droplet 24d is removed from the tip of welding wire 24 in pulse falling period IPFT before base current period IBT in the unstable molten droplet transfer (droplet removal) state illustrated in FIG. 3, as illustrated in FIG. 7, peak current period IPT is shortened to reduce the area of the pulse waveform, and the electrical energy applied to welding wire 24 is reduced to be appropriate.

In welding current I illustrated in FIG. 7, since the pulse area is small, in order to secure an appropriate melting speed of welding wire 24, peak current period IPT and pulse period PT are shortened to increase pulse frequency PHz to adjust peak current period IPT and pulse frequency PHz which are a pulse waveform parameter so that welding current I becomes the setting current which is an appropriate average current. This operation provides an optimal state of molten droplet transfer timing in which molten droplet 24d is removed in base current period IBT while stabilizing arc length L28.

In the above method for adjusting removal time point td at the molten droplet transfer by adjusting peak current period IPT, conversely, in a state of molten droplet transfer (droplet removal) state illustrated in FIG. 4, in state Sf2, molten droplet 24d is not removed during base current period IBT1 in pulse period PT1, after base current period IBT1, that is, in peak current period IPT2 in pulse period PT2 next to pulse period PT1, molten droplet 24d becomes an unstable molten droplet transfer (droplet removal) state of being enlarged and removed by the gravity. For state Sf2, peak current period IPT is lengthened, the area of the pulse waveform in one pulse period PT increases so as to optimize the electric energy applied to welding wire 24 for securing the appropriate melting speed of welding wire 24.

In welding current I described above, since the area of the pulse waveform increases, in order to secure the same melting speed, the lengthening of peak current period IPT and the lengthening of pulse period PT to lower pulse frequency PHz can adjust the molten droplet transfer (removal) state to be the optimal state while stabilizing arc length L28.

Figure 8:
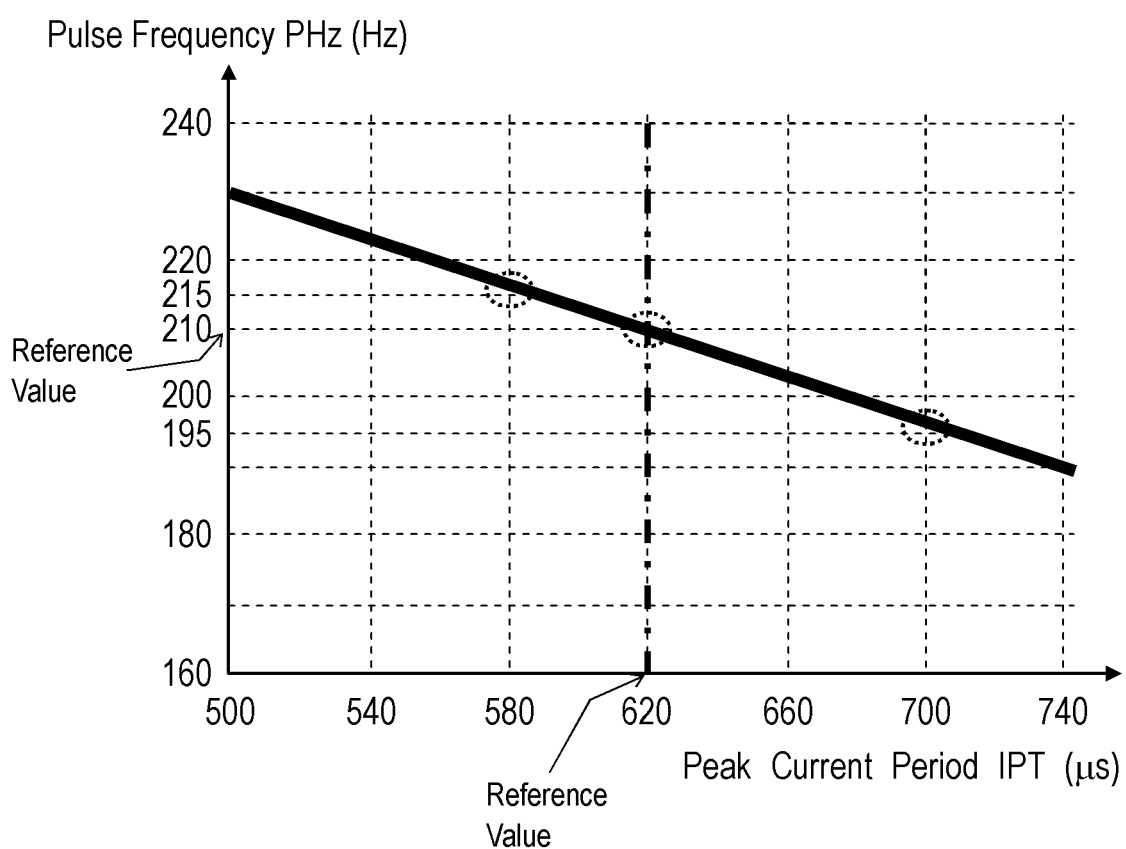
FIG. 8 illustrates a relationship between the pulse frequency and the peak current period of the pulse arc welding device according to Embodiment 1.

An example of specific adjustment of peak current period IPT and pulse frequency PHz in pulse arc welding device 1001 will be described below. FIG. 8 illustrates a predetermined relationship between peak current period IPT and pulse frequency PHz, which are pulse waveform parameters for optimally adjusting the molten droplet transfer (removal) state while stabilizing arc length L28.

FIG. 8 illustrates a predetermined relationship between peak current period IPT and pulse frequency PHz, which are pulse waveform parameters in a case where the diameter of welding wire 24 is ϕ1.2 and the setting current of welding current I is 200 A in the pulse MAG welding in which welding wire 24 is mild steel. In the relationship illustrated in FIG. 8, the reference value of peak current period IPT is 620 μs and the reference value of pulse frequency PHz is 210 Hz.

Adjustment of pulse waveform parameters based on the relationship illustrated in FIG. 8 of pulse arc welding device 1001 will be described below. In the example shown in FIG.

8, welding wire 24 or shielding gas different from the recommended conditions is used.

As illustrated in FIG. 3, in a case where molten droplet 24d is removed before base current period IBT and the timing of droplet removal is too early, it is determined that the melting speed of welding wire 24 is too high. In order to obtain the optimum pulse waveform area as the melting speed of welding wire 24, based on the predetermined relationship between pulse frequency PHz and peak current period IPT illustrated in FIG. 8, in a case where peak current period IPT is shortened from reference value 620 µs to 580 µs, stable arc length L28 can be secured by increasing pulse frequency PHz from reference value 210 Hz to 215 Hz.

In contrast, as illustrated in FIG. 4, in pulse period PT1, in a case where molten droplet 24d is not removed during base current period IBT 1 and molten droplet 24d is removed after base current period IBT1, that is, removal period td in which molten droplet 24d is removed is late to peak current period IPT 2 in pulse period PT 2 next to pulse period PT1, it is determined that the melting speed is too small. In order to obtain the optimum pulse waveform area which is the appropriate melting speed of welding wire 24, based on the predetermined relationship between pulse frequency PHz and peak current period IPT illustrated in FIG. 8, in a case where peak current period IPT is lengthened from the reference value of 620 µs to 700 µs, stable arc length L28 can be secured by decreasing pulse frequency PHz from reference value 210 Hz to 195 Hz.

As described above, when removal time point td at which molten droplet 24d is removed is not in base current period IBT1, peak current period IPT as the pulse waveform parameter is adjusted so as to be in base current period IBT1, and pulse frequency PHz is adjusted based on the predetermined relationship between pulse frequency PHz and peak current period IPT. Specifically, in a case where removal time point td at which molten droplet 24d is removed is too early, peak current period IPT decreases and pulse frequency PHz increases. In a case where removal time point td is too late, peak current period IPT increases and pulse frequency PHz decreases, and thus peak current period IPT and pulse frequency PHz which are pulse waveform parameters are adjusted.

It is determined that whether or not to change peak current IP and peak current period IPT from the reference value to the optimal numerical value by welding voltage V being monitored in real time in monitoring of the molten droplet transfer (droplet removal) state, and a state where constriction 24p is produced in base current period IBT being detected. That is, a time differential value obtained by differentiating welding voltage V with respect to time is compared to a predetermined value so as to determine removal time point td at which molten droplet 24d is removed from welding wire 24. Droplet-removal detector 13 of arc controller 12 of welding controller 31b can determine removal time point td to be a time point at which droplet-removal detector 13 detects a predetermined change of the differential value exceeding a predetermined value from below the predetermined value.

In a case where welding controller 31b detects that the time differential value of welding voltage V exceeds a predetermined value from a value smaller than the predetermined value at one or for each time of the pulse period with peak current period IPT or pulse falling period IPFT before base current period IBT, welding controller 31b determines that the melting speed of welding wire 24 is high and the electric energy for melting welding wire 24 is relatively large. Then, welding controller 31b adjusts the pulse waveform parameter to decrease peak current IP of the pulse waveform parameter or to decrease peak current period IPT.

In a case of adjusting peak current IP by decreasing peak current IP, welding controller 31b decreases peak current IP by a predetermined change, e.g. by the value of 5 A, for each pulse period PT while peak current IP is adjusted by monitoring the time differential value for each pulse period PT until the predetermined change of time differential value of welding voltage V in base current period IBT is detected. When the predetermined change of the time differential value of welding voltage V in base current period IBT is detected in one or each pulse period PT, the decrease of peak current IP is stopped.

Even in a case where peak current period IPT is reduced to be adjusted, similarly, while welding controller 31b decreases peak current period IPT by a predetermined change, e.g. by a value of 10 µs, for each pulse period PT, if welding controller 31b detects the predetermined change in welding voltage V in base current period IBT in one or each pulse period PT, welding controller 31b stops the decreasing of peak current period IPT.

In contrast, in a case where welding controller 31b detects the change of the time differential value of welding voltage V after base current period IBT of pulse period PT1, specifically at the time point after pulse period PT2 next to pulse period PT1 or in a case where welding controller 31b detects the predetermined change of the time differential value at a rate of one time in plural pulse periods PT without detecting the predetermined change of welding voltage V for each pulse period PT, welding controller 31b determines that the welding speed of welding wire 24 is late and the electric energy for melting welding wire 24 is relatively small. Then, welding controller 31b adjusts the pulse waveform parameter so as to increase peak current IP or increase peak current period IPT as the pulse waveform parameter.

In a case of adjusting by increasing peak current IP, since welding controller 31b increases peak current IP by a predetermined change, e.g. a value of 5 A for each pulse period PT, welding controller 31b adjusts peak current IP by monitoring the time differential value of welding voltage V for each pulse period PT until the predetermined change of the time differential value of welding voltage V in base current period IBT is detected. When welding controller 31b detects the predetermined change of the time differential value of welding voltage V in base current period IBT in one or each pulse period, welding controller 31b stops the increase of peak current IP.

In addition, similarly, even in a case of being adjusted and increasing peak current period IPT, since welding controller 31b increases peak current period IPT by a predetermined change, e.g. a value of 10 µs for each pulse period PT, when detecting the predetermined change of the time differential value of welding voltage V in one or each pulse period PT, welding controller 31b stops the increase of peak current period IPT.

Droplet-removal detector 13 may determine removal time point td at which molten droplet 24d is removed from by the value of welding voltage V instead of the time differential value of welding voltage V.

Removal time point td at which molten droplet 24d is removed from welding wire 24 may be determined by the resistance value obtained by dividing welding voltage V by welding current I. In this case, for example, droplet-removal detector 13 determines removal time point td to be a time point at which a predetermined change in which the time differential value obtained by differentiating the resistance value with respect to time exceeds the predetermined value from below the predetermined value is detected. Droplet-removal detector 13 may determine removal time point td with the resistance value itself instead of the time differential value of the resistance value. In a case where the change of welding voltage V caused by the removal of molten droplet 24d is small, since removal time point td may be erroneously determined based on welding voltage V, it is preferable to determine removal time point td.

In a case where the molten droplet transfer (droplet removal) state is monitored and the molten droplet transfer timing in the molten droplet transfer (droplet removal) state is performed by adjusting the pulse waveform parameter, it is also possible to combine adjustment of a plurality of parameters of each pulse waveform parameter. In the operation described above, peak current IP and peak current period IPT are adjusted to adjust removal time point td at which molten droplet 24d is removed. In pulse arc welding device 1001, welding controller 31b can adjust removal time point td by adjusting both peak current IP and peak current period IPT. In this case, in a case where both peak current IP and peak current period IPT are adjusted together based on the predetermined relationship with pulse frequency PHz illustrated in FIGS. 6 and 8, correlated pulse frequency PHz is also adjusted at the same time. By using plural parameters instead of one of the pulse waveform parameters, since the amount of change per one parameter can be reduced, the adjustment range of removal time point td can be widened.

Specifically, in pulse arc welding device 1001 according to Embodiment 1, both peak current IP and peak current period IPT of welding current I are adjusted and pulse frequency PHz is adjusted as follows.

For example, in a case where removal time point td is advanced while removal time point td of molten droplet 24d is too late as illustrated in FIG. 4, welding controller 31b increases peak current IP. In a case where peak current IP exceeding the maximum value that can be output by welding power supply unit 31a is required to cause removal time point td to be in base current period IBT as illustrated in FIG. 2, welding controller 31b increase peak current period IPT after increasing peak current IP to near the maximum value. Welding controller 31b increases peak current IP and adjusts pulse frequency PHz based on the predetermined relationship between peak current IP and pulse frequency PHz illustrated in FIG. 6, and increases peak current period IPT and adjusts pulse frequency PHz based on the predetermined relationship between peak current period IPT and pulse frequency PHz illustrated in FIG. 8.

Alternatively, welding controller 31b increases peak current period IPT in a case of advancing removal time point td of the removal of molten droplet 24d. In addition, as illustrated in FIG. 2, when peak current period IPT increases to cause removal time point td to be in base current period IBT, peak current period IPT1 in pulse period PT1 is too close to peak current period IPT2 in next pulse period PT2, so that base current period IBT1 becomes short and the pulse waveform cannot be formed. In this case, welding controller 31b increases peak current period IPT after increasing peak current period IP to near maximum allowable value thereof and then increases peak current IP. Welding controller 31b increases peak current period IPT and adjusts pulse frequency PHz based on the predetermined relationship between peak current period IPT and pulse frequency PHz illustrated in FIG. 8, and increases peak current IP and adjusts pulse frequency PHz based on the predetermined relationship between peak current IP and pulse frequency PHz illustrated in FIG. 6.

The material of welding wire 24 allowing a waveform illustrating a state where constriction 24p is produced by welding voltage V to likely appear is a soft steel wire or an aluminum wire. For the stainless steel wire, since a waveform illustrating a state where constriction 24p is produced by welding voltage V is unlikely to appear, it is difficult to detect the occurrence of constriction 24p.

In the pulse arc welding control method in Embodiment 1, pulse welding is performed in which an arc is generated between welding wire 24 and object 29, and peak current period IPT and base current period IBT are repeated. The time differential value of welding voltage V during welding is monitored. In a case where the time differential value exceeds a predetermined value, it is determined that molten droplet 24d is removed. If removal time point td at which molten droplet 24d is removed is not in base current period IBT, peak current IP and/or peak current period IPT of the pulse waveform parameter are adjusted and pulse frequency PHz is adjusted based on the predetermined relationship between pulse frequency PHz and peak current IP to cause removal time point td to be in base current period IBT.

In welding power supply device 31 illustrated in FIG. 1, short-circuit/arc detector 10 determines whether a short-circuit or an arc is generated between welding wire 24 and object 29 based on the output of welding voltage detector 8 and/or the output of welding current detector 9. Short-circuit controller 11 controls output controller 7 during the short-circuit period in which a short-circuit occurs. Arc controller 12 controls output controller 7 during the arc period in which an arc is generated.

Pulse waveform setting unit 14 sets the pulse waveform during the arc period.

In welding power supply device 31, upon receiving a signal indicating that a short-circuit is generated from short-circuit/arc detector 10, short-circuit controller 11 controls circuit current IS flowing in welding wire 24 during the short-circuit period to open the short-circuit.

Upon receiving from short-circuit/arc detector 10 a signal indicating that an arc is generated, arc controller 12 causes pulse waveform setting unit 14 of arc controller 12 to send the pulse waveform parameter, such as peak current IP, base current IB, peak current period IPT, and base current period IBT to pulse waveform controller 15.

In the arc state, droplet-removal detector 13 of arc controller 12 monitors welding voltage V detected by welding voltage detector 8 in real time to detect removal time point td at which the time differential value of the welding voltage V exceeds a predetermined value indicating that molten droplet 24d is removed. Arc controller 12 determines whether or not removal time point td is in base current period IBT.

If removal time point td at which molten droplet 24d is removed is in base current period IBT, arc controller 12 continues outputting the pulse waveform parameter output from pulse waveform setting unit 14 as it is. If removal time point td is out of base current period IBT, the pulse waveform parameter which is at least one of peak current IP and peak current period IPT is adjusted and corresponding to this, pulse frequency PHz based on the predetermined relationship between pulse waveform parameter and pulse frequency PHz is adjusted. Accordingly, while gradually changing the pulse waveform parameter, which is at least one of peak current IP and peak current period IPT, so that molten droplet 24d is removed in base current period IBT, removal time point td is adjusted as described above. Contents of the adjustment are stored in peak current corrector 16, peak current period corrector 17, and pulse frequency corrector 18, which correspond respectively in pulse waveform controller 15.

The relationship illustrated in FIGS. 6 and 8 can be experimentally obtained as follows. For each of samples of the welding wire 24 made of various materials and having various diameters, for example, peak current IP which is a pulse waveform parameter is adjusted, and pulse frequency PHz is adjusted correspondingly to cause molten droplet 24d to be removed in base current period IBT and perform the molten droplet transfer. Based on this adjustment, peak current IP of the corresponding pulse waveform parameter and the value of pulse frequency PHz are stored in a database of respective correctors, such as peak current corrector 16, peak current period corrector 17, and pulse frequency corrector 18, thereby obtaining the relation between peak current IP and pulse frequency PHz illustrated in FIG. 6. Similarly, for each of samples of the welding wire 24 made of various materials of welding wire 24 and having various diameters, peak current period IPT which is a pulse waveform parameter is adjusted to remove molten droplet 24d in base current period IBT and perform the molten droplet transfer, and pulse frequency PHz is adjusted accordingly. Based on this adjustment, the values of peak current period IPT and pulse frequency PHz of the corresponding pulse waveform parameters are stored in the database of the respective correctors, such as peak current corrector 16, peak current period corrector 17, and pulse frequency corrector 18, and the relation between peak current period IPT and pulse frequency PHz illustrated in FIG. 8 is obtained.

For example, in the setting of the setting current as the moving average, peak current IP which is a pulse waveform parameter is adjusted for the setting current values changing by 20 A in the range of the setting current from 100 A to 300 A, and pulse frequency PHz is adjusted correspondingly such that molten droplet 24d is removed to perform the molten droplet transfer in base current period IBT. Based on this adjustment, peak current IP of the corresponding pulse waveform parameter and the value of pulse frequency PHz are stored in the database of respective correctors, such as peak current corrector 16, peak current period corrector 17, and pulse frequency corrector 18, thereby obtaining the relation between peak current IP and pulse frequency PHz illustrated in FIG. 6. Similarly, peak current period IPT which is a pulse waveform parameter is adjusted and pulse frequency PHz is adjusted correspondingly such that molten droplet 24d is removed in base current period IBT to perform molten droplet transfer with respect to values of the setting current changing by 20 A in the range from 100 A to 300 A and perform molten droplet transfer. Based on this adjustment, the values of peak current period IPT and pulse frequency PHz of the corresponding pulse waveform parameters are stored in the database of the respective correctors such as peak current corrector 16, peak current period corrector 17, and pulse frequency corrector 18, thereby obtaining the relation between peak current period IPT and pulse frequency PHz illustrated in FIG. 8. These operations provide stable welding in a wide range of welding current I.

In addition, for example, at the value of the feeding speed of welding wire 24 for each 1 m/min in a range from 1 m/min to 10 m/min such that molten droplet 24d is removed in base current period IBT to perform the molten droplet transfer, peak current IP which is a pulse waveform parameter is adjusted, and pulse frequency PHz is adjusted correspondingly. On the basis of this adjustment, the values of peak current IP and pulse frequency PHz of the corresponding pulse waveform parameter are stored in the database of respective correctors, such as peak current corrector 16, peak current period corrector 17, and pulse frequency corrector 18, thereby obtaining the relation between peak current IP and pulse frequency PHz illustrated in FIG. 6. Similarly, peak current period IPT which is a pulse waveform parameter is adjusted, and pulse frequency PHz is adjusted correspondingly such that molten droplet 24d is removed in base current period IBT to perform the molten droplet transfer with respect to the values of the feeding speed of welding wire 24 changing by 1 m/min in the range from 1 m/min to 10 m/min. Based on this adjustment, the values of peak current IP and pulse frequency PHz of the corresponding pulse waveform parameter are stored in the database of respective correctors, such as peak current corrector 16, peak current period corrector 17, and pulse frequency corrector 18, thereby obtaining the relation between peak current period IPT and pulse frequency PHz illustrated in FIG. 8. This operation provides stable welding in a wide range of the welding speed of welding wire 24.

In addition to having the values of peak current IP, peak current period IPT, and pulse frequency PHz illustrating the relationship illustrated in FIGS. 6 and 8 as a database, it may be stored as a function, such as a linear function or a quadratic function, that approximates these values by interpolating.

It is possible to smoothly set the welding condition with the value of the pulse waveform parameter for adjusting the timing of molten droplet transfer (droplet removal) by deriving the value of the pulse waveform parameter by welding the test piece in a step before the welding condition is given.

In the case that the welding wire used by the user has different viscosity, surface tension and the like than the welding wire recommended by the welding machine manufacturer, the state of molten droplet transfer may greatly change, there is also no regularity at the timing of molten droplet transfer (droplet removal). This may not provide stable welding.

In a case where removal time point td at which molten droplet 24d is removed is in base current period IBT, welding controller 31b sets a pulse waveform parameter which is at least one of peak current IP and peak current period IPT, and pulse frequency PHz such that removal time point td is in predetermined base current period IBT. In a case where removal time point td at which molten droplet 24d is removed is in base current period IBT, welding controller 31b maintains the pulse waveform parameter and pulse frequency PHz so that removal time point td is in base current period IBT.

A pulse arc welding machine can ordinarily perform one welding transfer (droplet removal) per one peak current synchronously with the peak current, by selecting appropriate welding condition set separately for the welding wire recommended by the welding machine manufacturer.

However, in a case where it is difficult to appropriately perform molten droplet transfer (droplet removal) during the peak current period by changing the welding wire or welding conditions, a molten droplet may be removed at a rate of one for several time of peak currents, which makes the droplet transfer (droplet removal) unstable. In addition, large molten metal cumulatively adheres to the tip of the welding wire, is short-circuited with the base material, and causes spattering.

Figure 9:
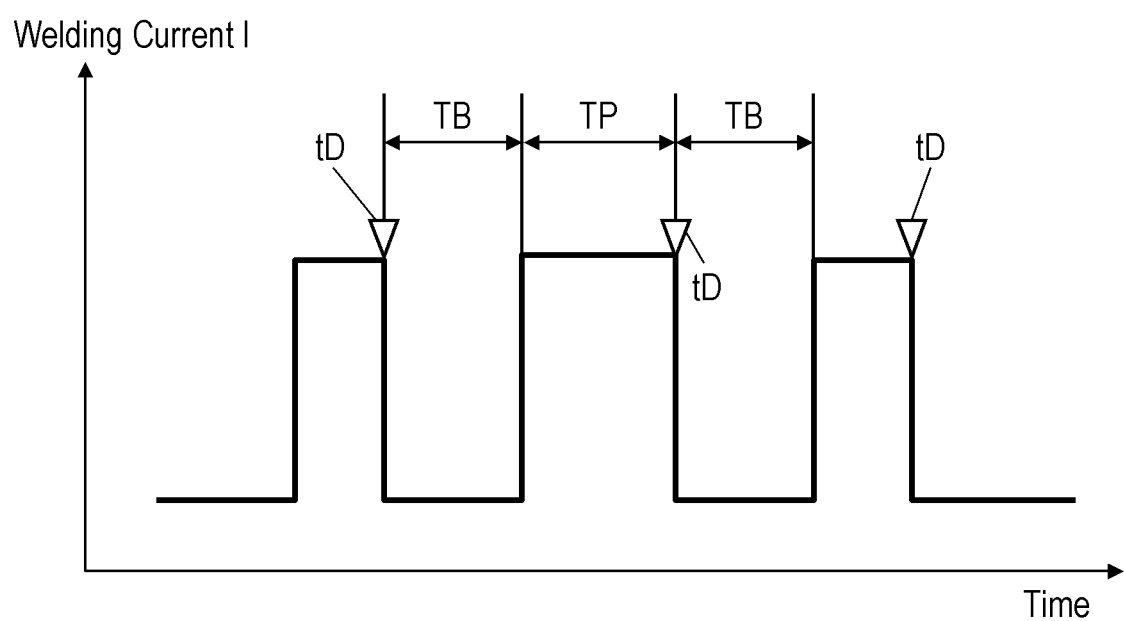
FIG. 9 illustrates a welding current of a comparative example of a pulse arc welding.

FIG. 9 illustrates the welding current in the pulse arc welding of the comparative example for solving the problem described above. In this pulse arc welding method, in order to improve the stability of molten droplet transfer (droplet removal) to improve welding workability, as illustrated in FIG. 9, until the molten droplet transfer (removal) occurs, peak current period TP continues and droplet transfer (removal) is reliably generated one time per one period of the pulse.

However, although the one drop per one pulse is surely performed, while time point td at which molten droplet transfer (droplet removal) is performed is in peak current period TP, the length of peak current period TP is changed for each time. Therefore, since the pulse periodicity varies, the arc length fluctuates largely and may lose welding stability, hence causing instability of welding to appear on the outer appearance of the bead.

In the event that a short-circuit occurs with a base material before molten droplet transfer (droplet removal), a large amount of spattering may be produced with a short-circuit at a high peak current value. Therefore, in this pulse arc welding, welding stability may not be secured.

In the pulse arc welding control method and pulse arc welding device 1001 in accordance with Embodiment 1, a molten droplet transfer (droplet removal) state is detected. If removal time point td of the molten droplet transfer (droplet removal) is not in base current period IBT, peak current IP and/or peak current period IPT as the pulse waveform parameter is adjusted, and pulse frequency PHz is adjusted such that the pulse waveform is within base current period IBT, thereby performing stable welding of one drop per one pulse of one pulse period PT, and providing high welding quality, such as obtaining a homogeneous bead.

Exemplary Embodiment 2

Figure 10:
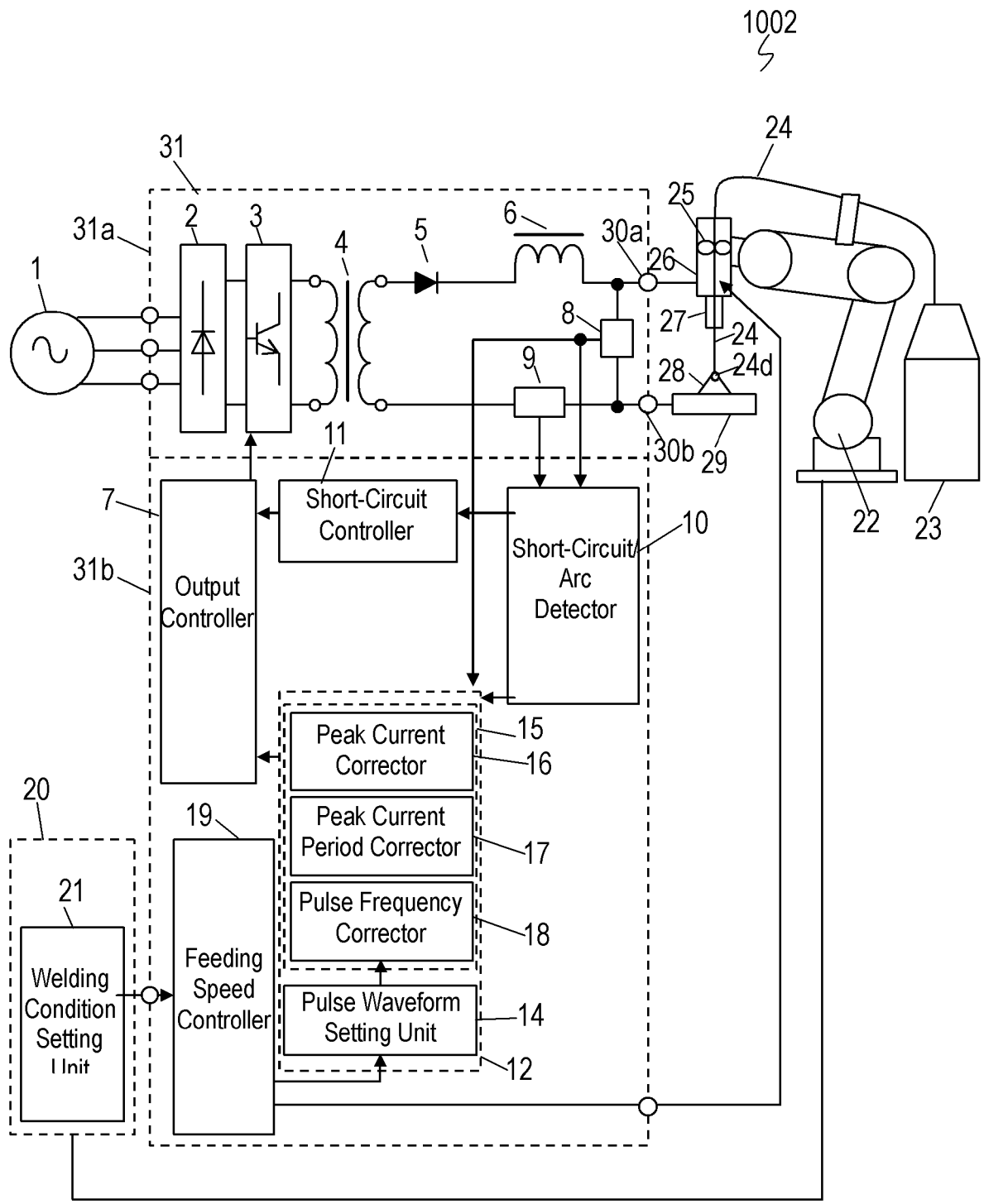
FIG. 10 is a schematic diagram of a pulse arc welding device according to Exemplary Embodiment 2.

FIG. 10 is a schematic diagram of pulse arc welding device 1002 according to Exemplary Embodiment 2. In FIG. 10, components identical to those of pulse arc welding device 1001 according to Embodiment 1 illustrated in FIG. 1 are denoted by the reference numerals. Pulse arc welding device 1002 according to Embodiment 2 does not include droplet-removal detector 13 of welding controller 31b of pulse arc welding device 1001 according to Embodiment 1.

In pulse arc welding device 1002, short-circuit/arc detector 10 detects a short-circuit between welding wire 24 and object 29 based on welding voltage V, thereby detecting that the molten droplet is removed from welding wire 24. In order to eliminate unstable molten droplet transfer state due to different welding conditions, such as welding wire 24 and shielding gas to be used, pulse arc welding device 1002 is designed such that molten droplet transfer state becomes an optimal state. If removal time point td of molten droplet transfer (droplet removal) is not in base current period IBT, one or more pulse waveform parameters are adjusted such that removal time point td is in base current period IBT, and the one or more pulse waveform parameters are adjusted such that the time point described above is in base current period IBT.

Figure 11:
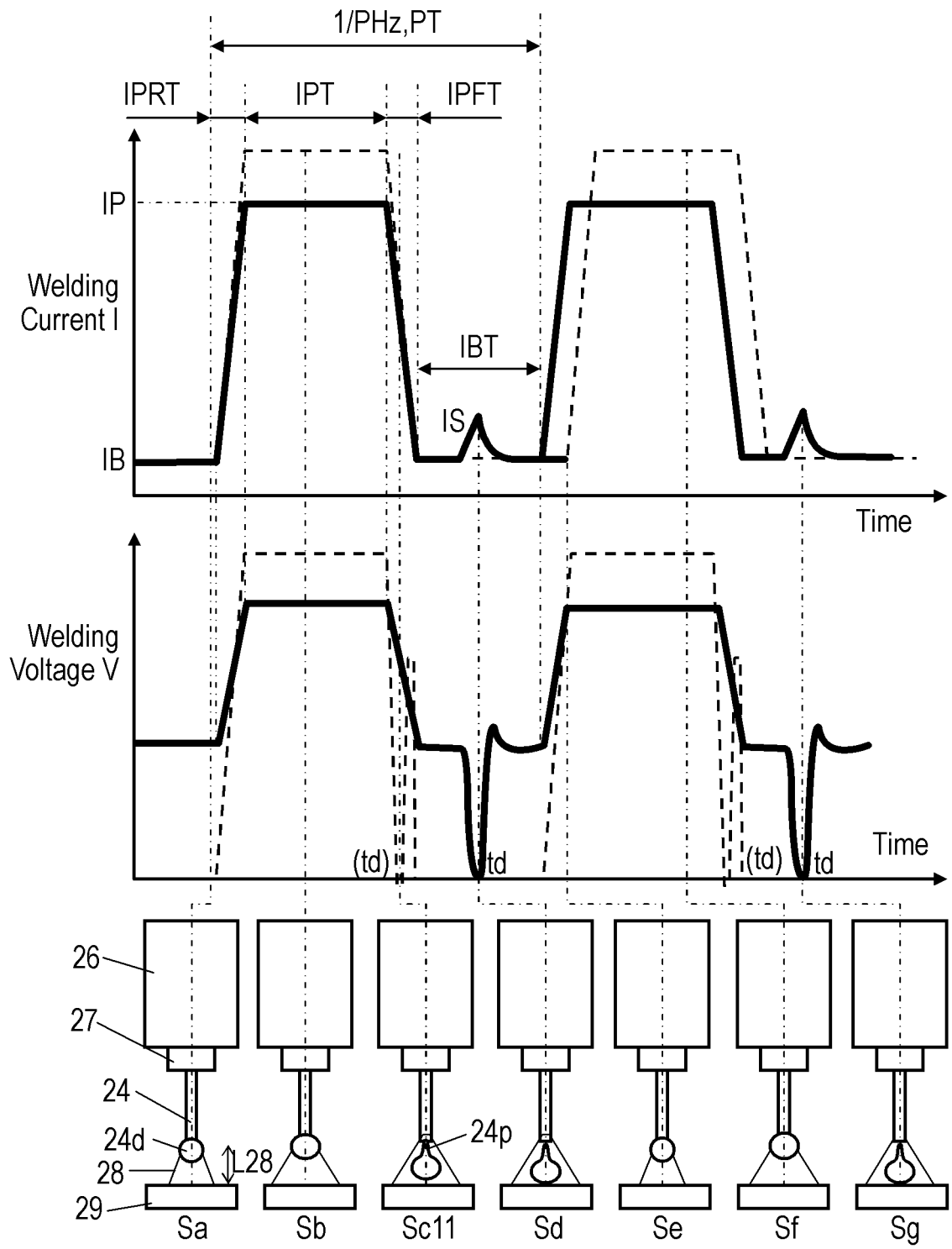
FIG. 11 illustrates a welding current, a welding voltage, and a state of droplet transfer of the pulse arc welding device according to Embodiment 2.

FIG. 11 illustrates welding current I, welding voltage V, and a state of molten droplet transfer when welding controller 31b adjusts the removal time point at which molten droplet 24d of the molten droplet transfer is removed from welding wire 24 at peak current IP in pulse arc welding device 1002 in accordance with Embodiment 2. In FIG. 11, items identical to welding current I, welding current I, and a state of molten droplet transfer in pulse arc welding device 1001 according to Embodiment 1 illustrated in FIG. 1 will be denoted by the same reference numerals. Specifically, before adjustment of the pulse waveform parameter, which is at least one of peak current IP and peak current period IPT, short-circuit/arc detector 10 detects a short-circuit between welding wire 24 and object 29 during actual welding in real time. Welding controller 31b determines that the electric energy for melting welding wire 24 is excessive, in a state (broken line state Sc11 of welding voltage V) where molten droplet 24d is short-circuited with object 29 at the tip of welding wire 24 in pulse falling period IPFT before base current period IBT earlier than base current period IBT. In this case, welding controller 31b decreases peak current IP, which is a pulse waveform parameter, reduces the area of the pulse waveform, and optimizes electrical energy so as to obtain welding current I and welding voltage V illustrated by the solid line in FIG. 11. When welding wire 24 is short-circuited with object 29 via molten droplet 24d, welding power supply unit 31a causes short-circuit current IS to flow through welding wire 24.

In the waveform parameters illustrated in FIG. 11, since the area of the pulse waveform is small, pulse period PT is shortened and pulse frequency PHz is adjusted to be high in order to secure an appropriate wire melting speed. Accordingly, peak current IP and pulse frequency PHz which are pulse waveform parameters are adjusted such that the average value of welding current I becomes the appropriate setting current. Removal time point td at which molten droplet 24d is removed from welding wire 24 while arc length L28 is stabilized can be adjusted to the timing of the optimal state in base current period IBT.

Before adjustment of the pulse waveform parameter, a short-circuit during welding is detected in real time, molten droplet 24d is not removed during base current period IBT, molten droplet 24d is enlarged at peak current period IPT after base current period IBT later than base current period IBT, and then, welding wire 24 is short-circuited with object 29 via molten droplet 24d contacting object 29 at the tip of welding wire 24. In this case, welding controller 31b determines that the melting speed of welding wire 24 is excessively small and thus the electric energy for melting welding wire 24 is excessively small. Then, welding controller 31b increases peak current IP, which is a pulse waveform parameter, to increase the area of the pulse waveform to make the electrical energy appropriate.

In the control described above, since the area of the pulse waveform increases, in order to secure the appropriate melting speed of welding wire 24 properly, welding controller 31b simultaneously increases pulse period PT and adjusts pulse frequency PHz to be low. As described above, welding controller 31b adjusts peak current IP and pulse frequency PHz, which are pulse waveform parameters, so that the average value of welding current I becomes properly setting current. Welding controller 31b thus adjusts removal time point td at which molten droplet 24d is removed to an optimal state which is in base current period IBT while making stable arc length L28.

Figure 12:
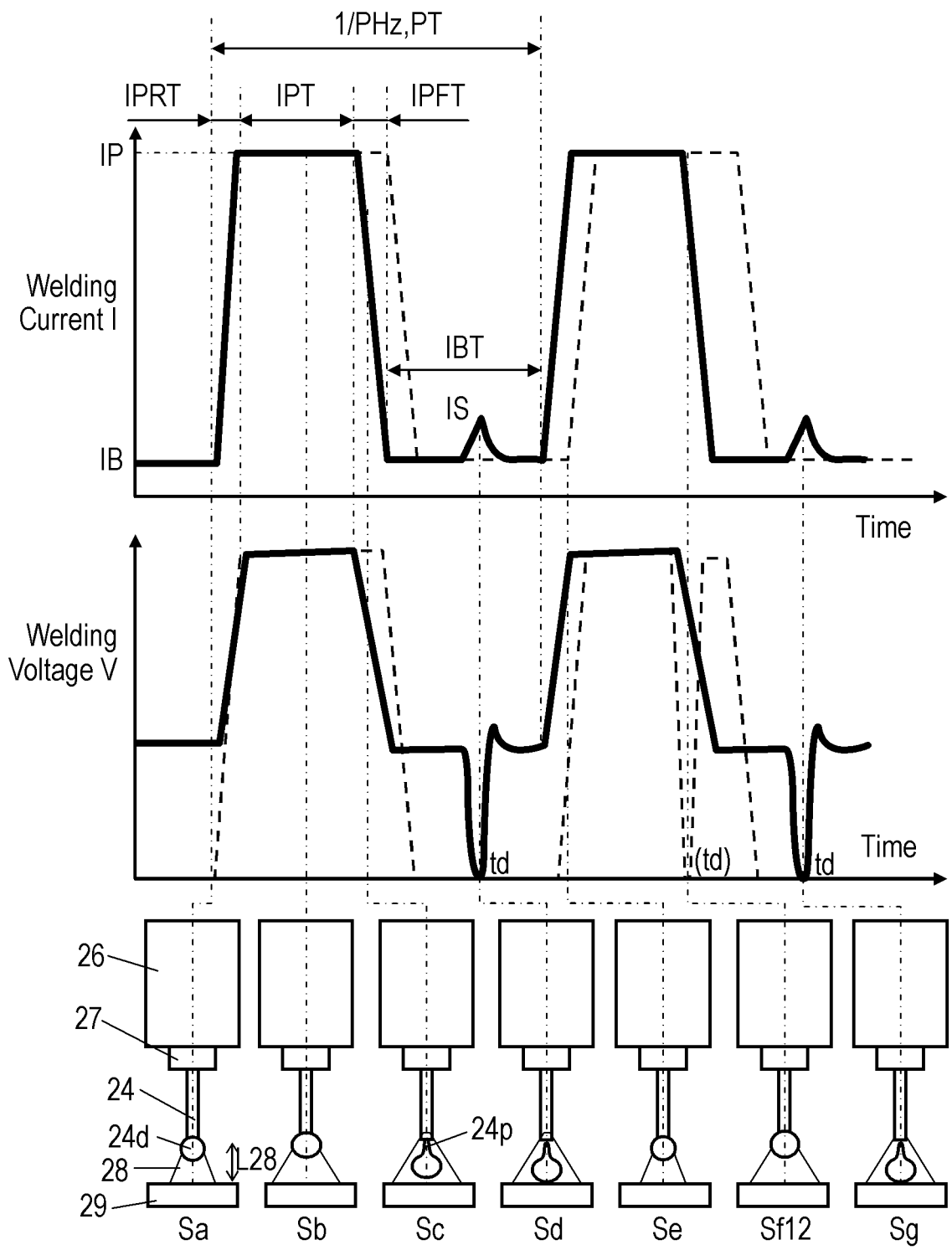
FIG. 12 illustrates a welding current, a welding voltage, and a state of droplet transfer of the pulse arc welding device according to Embodiment 2.

FIG. 12 illustrates welding current I and welding voltage V and a state of short-circuit transfer when the short-circuit transfer timing at which molten droplet 24d is short-circuited with object 29 in peak current period IPT is adjusted by detecting the short-circuit during welding in real time. Specifically, short-circuit/arc detector 10 detects molten droplet transfer (short-circuit), molten droplet 24d is removed from welding wire 24 before base current period IBT. For a state (state Sf12 at welding current I and welding voltage V indicated by broken line) where molten droplet 24d is short-circuited with object 29 at the tip of welding wire 24 in pulse falling period IPFT, welding controller 31b shortens peak current period IPT which is a pulse waveform parameter to reduce the area of the pulse waveform to make the electric energy appropriate so as to obtain welding current I and welding voltage V indicated by the solid line.

In the control illustrated in FIG. 12, since the area of the pulse waveform is small, in order to secure the appropriate melting speed of welding wire 24, welding controller 31b can adjust the timing of the optimal state where removal time point td of the molten droplet transfer (short-circuit) is in base current period IBT while stabilizing arc length L28 by shortening pulse period PT to increase pulse frequency PHz.

A short-circuit during welding is detected in real time, a short-circuit does not occur during base current period IBT1 of pulse period PT1, molten droplet 24d is enlarged in peak current period IPT2 of next pulse period PT 2 after base current period IBT1, and molten droplet 24d is short-circuited with object 29 at the tip of welding wire 24. In this case, it is in an unstable molten droplet transfer (short-circuit) state. In this case, peak current period IPT, which is a pulse waveform parameter, is lengthened, the area of the pulse waveform is increased, and the electrical energy becomes appropriate in order to secure an appropriate melting speed of welding wire 24.

In the adjustment described above of the pulse waveform parameter, since the area of the pulse waveform increases, in order to secure the melting speed of welding wire 24 identical to the melting speed of welding wire 24 before the area is increased, welding controller 31b simultaneously increases pulse period PT, decreases pulse frequency PHz and thus peak current period IPT and pulse frequency PHz which are the pulse waveform parameters are adjusted such that the average value of welding current I becomes the setting current. Accordingly, removal time point td at which the short-circuit is generated and molten droplet 24d is removed while arc length L28 is stabilized is adjusted to be the timing of the optimal state that becomes base current period IBT so that short-circuit occurs during base current period IBT1.

Similarly to pulse arc welding device 1001 in Embodiment 1, pulse arc welding device 1002 may adjust the time point at which molten droplet 24d is short-circuited with object 29, that is, removal time point td by adjusting both peak current IP and peak current period IPT and adjusting pulse frequency PHz.

In pulse arc welding device 1002 according to Embodiment 2, an arc is generated between welding wire 24 and object 29 to perform pulse welding repeating peak current period IPT and base current period IBT. Short-circuit/arc detector 10 of welding controller 31b detects a short-circuit during welding, and determines the time point when the short-circuit is detected, that is, the time point when the time point is detected based on the short-circuit, as removal time point td at which molten droplet 24d is removed. Welding controller 31b adjusts at least one of peak current IP and peak current period IPT so that the time point when the short-circuit is detected is in base current period IBT, and adjusts pulse frequency PHz based on at least one of the predetermined relationship between pulse frequency PHz and peak current IP illustrated in FIG. 6 of pulse arc welding device 1001 in accordance with Embodiment 1 and the predetermined relationship between pulse frequency PHz and peak current period IPT illustrated in FIG. 8.

Compared to recommended welding conditions, such as welding wire and shielding gas recommended by welding machine manufacturers, if the welding wire used by the user has different welding conditions, such as viscosity, surface tension, and shielding gas, the molten droplet transfer form greatly differs, and thus there is also no regularity in the timing of molten droplet transfer timing, and therefore, stable welding may not be performed.

In the pulse arc welding method and pulse arc welding device 1002 in accordance with Embodiment 2, a short-circuit of molten droplet 24d is detected. If removal time point td at which molten droplet 24d is removed is not in base current period IBT, the pulse waveform parameter which is at least one of peak current IP and peak current period IPT is adjusted and pulse frequency PHz is adjusted such that removal time point td is in base current period IBT. This operation provides stable molten droplet transfer (droplet removal), stable pulse welding, and homogeneous welding quality.

As described above, the pulse arc welding control method uses a pulse arc welding device 1001 (1002) that welds an object 29 by generating an arc between a welding wire 24 and the object 29. Pulse arc welding device 1001 (1002) is controlled so as to weld the object 29 by removing, from the welding wire 24, a molten droplet 24d produced by melting the welding wire 24 by applying a welding voltage V between the welding wire 24 and the object 29 and allowing a welding current I to flow through the welding wire 24 such that the welding current I alternately repeats, at pulse frequency PHz, a peak current period IPT in which the welding current I is a peak current IP and a base current period IBT in which the welding current I is a base current IB smaller than the peak current IP. Removal time point td at which the molten droplet 24d is removed from the welding wire 24 is determined. In a case where the removal time point td is not in the base current period IBT, a pulse waveform parameter which is at least one of the peak current IP and the peak current period IPT is adjusted. Pulse frequency PHz is adjusted based on a predetermined relationship between the pulse frequency PHz and the pulse waveform parameter so as to cause the removal time point td to be in the base current period IBT.

In a case where removal time point td is before base current period IBT, peak current IP may be decreased and pulse frequency PHz may be increased. In a case where removal time point td is after base current period IBT, peak current IP may be increased and pulse frequency PHz may be decreased.

In a case where removal time point td is before base current period IBT, peak current period IPT may be decreased and pulse frequency PHz may be increased. In a case where removal time point td is after peak current period IPT, peak current period IPT may be increased and pulse frequency PHz may be decreased.

Pulse arc welding device 1001 (1002) may be controlled such that welding current I alternately repeats peak current period IPT and base current period IBT at pulse frequency PHz over plural pulse periods PT. In this case, the pulse waveform parameter is gradually adjusted over pulse periods PT and pulse frequency PHz is gradually adjusted over pulse periods PT. When removal time point td enters base current period IBT, the adjustment of the pulse waveform parameter is terminated and adjustment of pulse frequency PHz is terminated.

The pulse waveform parameter may be peak current IP. The pulse waveform parameter may be peak current period IPT. The pulse waveform parameter may be peak current IP and peak current period IPT.

A time point when the time differential value obtained by differentiating welding voltage V with time exceeds a predetermined value from below the predetermined value may be determined as removal time point td.

A time point at which the time differential value obtained by differentiating the resistance value obtained by dividing welding voltage V by welding current I with time exceeds a predetermined value from below the predetermined value may be determined as removal time point td.

The removal time point td at which molten droplet 24*d* is removed from welding wire 24 may be determined based on the time point at which the short-circuit between welding wire 24 and object 29 is detected.

The pulse waveform parameter and pulse frequency PHz may be set such that removal time point td is in base current period IBT in a case where removal time point td is in base current period IBT. In this case, the pulse waveform parameter and pulse frequency PHz may be maintained.

In pulse arc welding device 1001 (1002), an arc is generated between welding wire 24 and object 29 to weld object 29. Pulse arc welding device 1001 (1002) includes wire feeder 25 that feeds welding wire 24, welding power supply unit 31*a* that outputs welding voltage V and welding current I, welding controller 31*b* that controls welding power supply unit 31*a*. Welding controller 31*b* is configured to control the welding power supply unit 31*a* so as to weld the object 29 by removing, from the welding wire 24, a molten droplet 24*d* produced by melting the welding wire 24 by applying a welding voltage V between the welding wire 24 and the object 29 and allowing a welding current I to flow through the welding wire 24 such that the welding current I alternately repeats, at pulse frequency PHz, a peak current period IPT in which the welding current I is a peak current IP and a base current period IBT in which the welding current I is a base current IB smaller than the peak current IP. Welding controller 31*b* is configured to determine a removal time point td at which the molten droplet 24*d* is removed from the welding wire 24. In a case where the removal time point td is not in the base current period IBT, welding controller 31*b* is configured to adjust a pulse waveform parameter which is at least one of the peak current IP and the peak current period IPT and adjust the pulse frequency PHz based on a predetermined relationship between the pulse frequency PHz and the pulse waveform parameter so as to cause the removal time point td is in the base current period IBT.

Welding controller 31*b* includes welding condition setting unit 21 for setting a setting current which is a value of welding current I, feeding speed controller 19 that controls the feeding speed at which wire feeder 25 feeds the wire based on the setting current, and pulse waveform setting unit 14 that outputs a signal corresponding to the waveform of welding current I based on the setting current or the wire feeding speed.

The arc welding control method in accordance with Embodiments 1 and 2 provide stable pulse welding even in a case where the user does not use welding conditions, such as welding wire and shielding gas, recommended by the welding machine manufacturer. These arc welding control methods are useful for a welding device that performs arc welding while continuously feeding a welding wire that is a consumable electrode.

REFERENCE MARKS IN THE DRAWINGS

IP peak current
IPT, IPT1, IPT2, TP peak current period
IB base current
IBT, IBT1, IBT2 base current period
IPRT, IPRT1, IPRT2 pulse rising period
IPFT, IPFT1, IPFT2 pulse falling period
PHz pulse frequency
PT, PT1, PT2 pulse period
1 input power supply
2 primary rectifier
3 switching element
4 transformer
5 secondary rectifier
6 reactor
7 output controller
8 welding voltage detector
9 welding current detector
10 short-circuit/arc detector
11 short-circuit controller
12 arc controller
13 droplet-removal detector
14 pulse waveform setting unit
15 pulse waveform controller
16 peak current corrector
17 peak current period corrector
18 pulse frequency corrector
19 feeding speed controller
20 robot controller
21 welding condition setting unit
22 robot
23 welding wire storage unit
24 welding wire
25 wire feeder
26 torch
27 chip
28 arc
29 object
30*a* output terminal
30*b* output terminal
31 welding power supply device
31*a* welding power supply unit
31*b* welding controller
1001 pulse arc welding device
1002 pulse arc welding device

The invention claimed is:

1. A pulse arc welding control method using a pulse arc welding device that welds an object by generating an arc between a welding wire and the object, the pulse arc welding control method comprising:

controlling the pulse arc welding device, so as to weld the object by removing from the welding wire a molten droplet produced by melting the welding wire by applying a welding voltage between the welding wire and the object and allowing a welding current to flow through the welding wire, such that the welding current alternately repeats, at pulse frequency, a peak current period in which the welding current is a peak current and a base current period in which the welding current is a base current smaller than the peak current;

determining a removal time point at which the molten droplet is removed from the welding wire; and in a case where the removal time point is not in the base current period, adjusting a pulse waveform parameter which is at least one of the peak current and the peak current period and adjusting the pulse frequency based on a predetermined relationship between the pulse frequency and the pulse waveform parameter so as to cause the removal time point to be in the base current period, wherein the adjusting of the pulse waveform parameter and the adjusting of the pulse frequency comprises:

decreasing the peak current and increasing the pulse frequency in a case where the removal time point is before the base current period; and increasing the peak current and decreasing the pulse frequency in a case where the removal time point is after the base current period.

2. A pulse arc welding control method using a pulse arc welding device that welds an object by generating an arc between a welding wire and the object, the pulse arc welding control method comprising:

controlling the pulse arc welding device, so as to weld the object by removing from the welding wire a molten droplet produced by melting the welding wire by applying a welding voltage between the welding wire and the object and allowing a welding current to flow through the welding wire, such that the welding current alternately repeats, at pulse frequency, a peak current period in which the welding current is a peak current and a base current period in which the welding current is a base current smaller than the peak current;

determining a removal time point at which the molten droplet is removed from the welding wire; and in a case where the removal time point is not in the base current period, adjusting a pulse waveform parameter which is at least one of the peak current and the peak current period and adjusting the pulse frequency based on a predetermined relationship between the pulse frequency and the pulse waveform parameter so as to cause the removal time point to be in the base current period, wherein the adjusting of the pulse waveform parameter and the adjusting of the pulse frequency comprises:

decreasing the peak current period and increasing the pulse frequency in a case where the removal time point is before the base current period; and increasing the peak current period and decreasing the pulse frequency in a case where the removal time point is after the peak current period.

3. A pulse arc welding control method using a pulse arc welding device that welds an object by generating an arc between a welding wire and the object, the pulse arc welding control method comprising:

controlling the pulse arc welding device, so as to weld the object by removing from the welding wire a molten droplet produced by melting the welding wire by applying a welding voltage between the welding wire and the object and allowing a welding current to flow through the welding wire, such that the welding current alternately repeats, at pulse frequency, a peak current period in which the welding current is a peak current and a base current period in which the welding current is a base current smaller than the peak current;

determining a removal time point at which the molten droplet is removed from the welding wire; and in a case where the removal time point is not in the base current period, adjusting a pulse waveform parameter which is at least one of the peak current and the peak current period and adjusting the pulse frequency based on a predetermined relationship between the pulse frequency and the pulse waveform parameter so as to cause the removal time point to be in the base current period, wherein the controlling of the pulse arc welding device comprises controlling the pulse arc welding device such that the welding current alternately repeats the peak current period and the base current period at the pulse frequency in a plurality of pulse periods, and wherein the adjusting of the pulse waveform parameter and the adjusting of the pulse frequency comprises:

gradually adjusting the pulse waveform parameter and the pulse frequency over the plurality of pulse periods; and terminating the adjusting of the pulse waveform parameter and the adjusting of the pulse frequency when the removal time point enters in the base current period.

4. The pulse arc welding control method according to claim 1, wherein the pulse waveform parameter is the peak current.

5. The pulse arc welding control method according to claim 1, wherein the pulse waveform parameter is the peak current period.

6. The pulse arc welding control method according to claim 1, wherein the pulse waveform parameter is the peak current and the peak current period.

7. The pulse arc welding control method according to claim 1, wherein the determining of the removal time point comprises determining the removal time point to be a time point at which a time differential value obtained by differentiating the welding voltage with time exceeds a predetermined value from below the predetermined value.

8. The pulse arc welding control method according to claim 1, wherein the determining of the removal time point comprises determining the removal time point to be a time point at which a time differential value obtained by differentiating a resistance value obtained by dividing the welding voltage by the welding current with time exceeds a predetermined value from below the predetermined value.

9. The pulse arc welding control method according to claim 1, wherein the determining of the removal time point comprises determining the removal time point based on a time point at which a short-circuit between the welding wire and the object is detected.

10. The pulse arc welding control method according to claim 1, further comprising in a case where the removal time point is in the base current period, setting the pulse waveform parameter and the pulse frequency such that the removal time point is in the base current period.

11. The pulse arc welding control method according to claim 10, wherein the setting of the pulse waveform parameter and the pulse frequency such that the removal time point is in the base current period in the case where the removal time point is in the base current period comprises maintaining the pulse waveform parameter and the pulse frequency in the case where the removal time point is in the base current period.

* * * * *